March 5, 1957  L. F. MILLER  2,783,509

CORE BLOWER, MOLDING AND DRAW MACHINE

Filed Feb. 23, 1952  4 Sheets-Sheet 1

Fig.1

INVENTOR.
LEON F. MILLER
BY
Oberlin & Limbach
ATTORNEYS.

March 5, 1957 — L. F. MILLER — 2,783,509
CORE BLOWER, MOLDING AND DRAW MACHINE
Filed Feb. 23, 1952 — 4 Sheets-Sheet 2

Fig. 2

INVENTOR.
LEON F. MILLER
BY
Oberlin & Limbach
ATTORNEYS.

March 5, 1957 L. F. MILLER 2,783,509
CORE BLOWER, MOLDING AND DRAW MACHINE
Filed Feb. 23, 1952 4 Sheets-Sheet 3

INVENTOR.
LEON F. MILLER
BY
Oberlin + Limbach
ATTORNEYS.

Fig. 7

United States Patent Office 2,783,509
Patented Mar. 5, 1957

2,783,509

CORE BLOWER, MOLDING AND DRAW MACHINE

Leon F. Miller, Fairview Park, Ohio, assignor to The Osborn Manufacturing Company, Cleveland, Ohio, a corporation of Ohio Application February 23, 1952, Serial No. 272,969

33 Claims. (Cl. 22—21)

This invention relates as indicated to core and mold making machines, and more particularly to an automatic or semi-automatic machine adapted to operate continuously through a cycle including the drawing of such core or mold and delivery of the same from the machine.

In the core and mold making art, it is very desirable that as many operations as possible be performed mechanically since many of such operations frequently involve the handling of relatively heavy articles, and much skill may be required of an operator if consistently satisfactory cores or molds are to be produced. As a practical matter, however, due to the character of the work, a great deal of skilled manual labor is still employed with resultant relatively high costs of production. Since cores and molds must conform closely to various specifications and although frequently of considerable weight may be quite delicate, an excessive number of rejects is likely when the operator has become fatigued.

It is accordingly a principal object of this invention to provide an automatic mold and core making machine adapted to produce molds and cores of uniform high quality at a very rapid rate.

It is another object of this invention to provide such machine including means for automatically drawing such molds or cores.

It is still another object of this invention to provide such machine which will require the employment of a minimum number of operators who may in addition be relatively unskilled.

A further object is to provide such machine which may be very quickly set up for any particular operation so as to permit a shift from one product to another with a minimum of down time.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
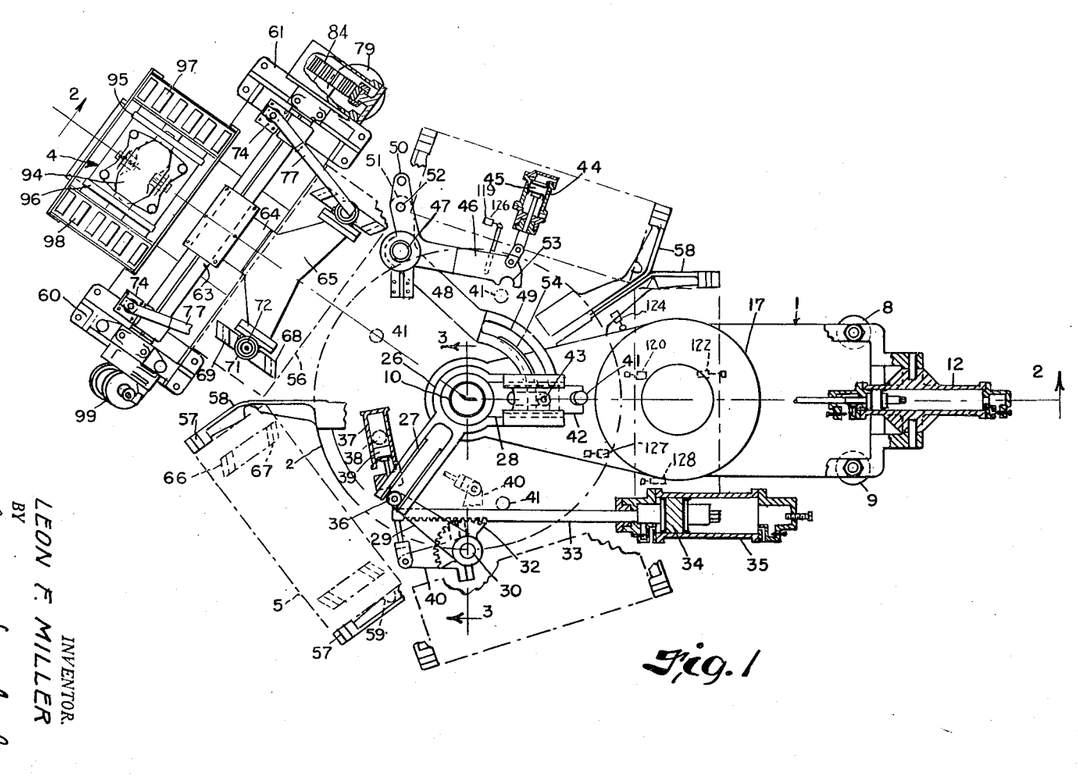
Fig. 1 is a top plan view of the operating elements of a machine embodying the principles of my invention with certain portions omitted or broken away to disclose the underlying mechanism.
Figure 2:
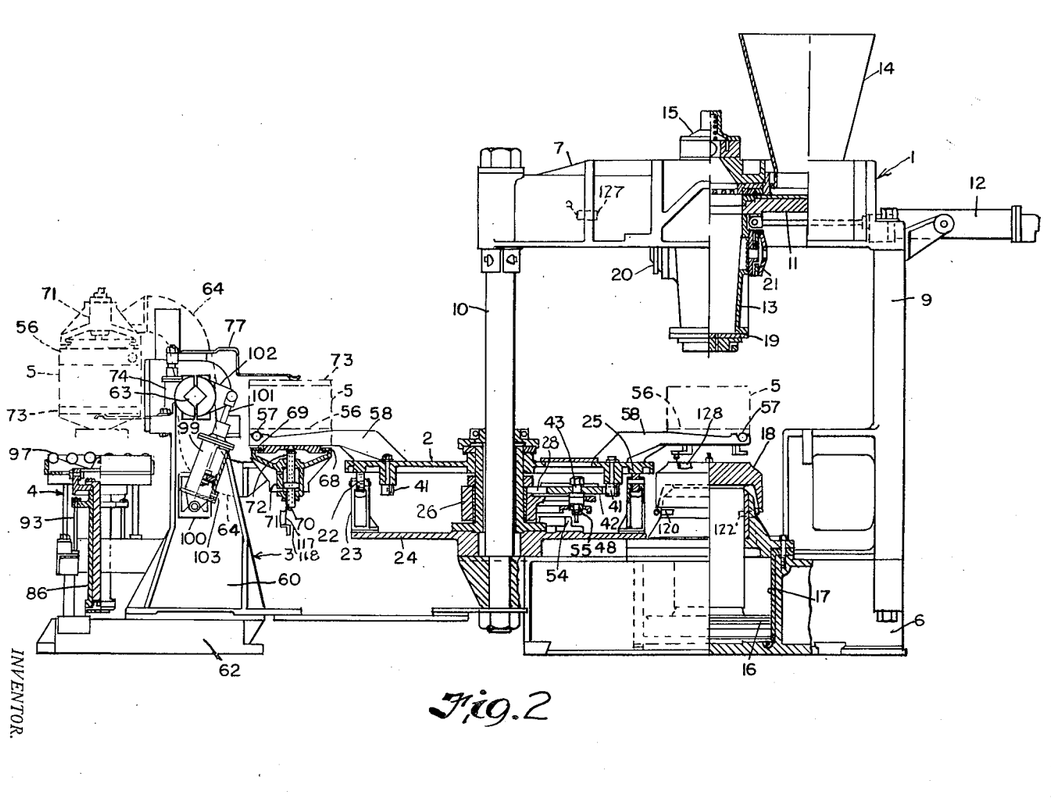
Fig. 2 is a side elevation corresponding to Fig. 1 with certain portions shown in vertical section along the lines 2—2 on Fig. 1.

Now referring more particularly to such drawing and especially Figs. 1 and 2 thereof, the embodiment of the invention there illustrated comprises a core blowing machine indicated generally by the numeral 1, an indexing table 2, a rock-over device indicated generally at 3 and a draw table 4. Such core blower is adapted to utilize compressed air in conventional manner to blow or drive prepared sand or equivalent medium into the usual core boxes 5. The turntable 2 is adapted to transport five core boxes through a cycle including five different stations or dwells, two of such stations being located at such core blower 1 and rock-over device 3 respectively. Such rock-over device not only takes the filled core boxes from the turntable and inverts them for performance of the drawing operation but then also returns the empty boxes to the turntable for further indexing into position for performance of another blowing operation. An electrical control system for the complete unit includes an electric timer adapted to open and close contacts in predetermined sequence to determine the operation of solenoid actuated air valves which in turn control the admission of air to the various piston-cylinder assemblies and the like which drive the mechanism.

*The core blowing unit*

While the various component parts of my new machine are interrelated in a novel manner to cooperate in producing and delivering completed molds or cores, it will nevertheless be convenient first to consider certain major components individually prior to an explanation of their combined operation.

The core blowing machine generally indicated at 1 in Figs. 1 and 2 may be of general conventional construction including a heavy base frame 6 and an upper frame or head 7. Such head is supported on base 6 by three vertical strain rods 8, 9 and 10. Rods 8 and 9 are spaced apart to allow slide carriage 11 to reciprocate therebetween through action of double-acting piston-cylinder assembly 12, thereby reciprocating sand reservoir 13 from a position beneath hopper 14 to a position beneath blow head 15. Mounted in the base 6 of the core blowing machine is a conventional clamp piston 16 vertically reciprocable in cylinder 17 and carrying a clamp table 18 adapted to engage and raise a core box into engagement with the blow plate 19 on the bottom of reservoir 13. Such reservoir will preferably be provided with exhaust valves such as 20 and 21 of the type disclosed in Patent No. 2,545,944 to R. W. Ellms. The core blowing machine itself may be of the general type described in such patent.

*The indexing mechanism*

The turntable 2 is journalled for rotation about strain rod 10 on suitable bearings and is supported by a plurality of rollers 22 carried by upstanding brackets 23 mounted on a lower rigid table 24 integral with base frame 6. Such rollers engage an annular track or rail 25 on the underside of table 2 adjacent the outer periphery of the latter. Imposition of excessive stresses and strains at the center bearing is accordingly avoided.

Figure 3:
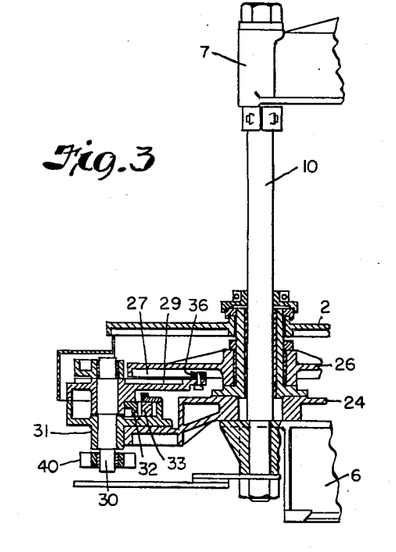
Fig. 3 is a fragmentary vertical section taken along the line 3—3 on Fig. 1 but with the interengaging indexing elements brought into alignment.

As will be explained in greater detail below when the operation of the entire machine is discussed, the turntable 2 may be indexed in either a clockwise or counterclockwise direction as desired. Unless otherwise stated here-after, it may be assumed that counterclockwise rotation is intended. Also journalled for rotation about the axis of strain rod 10 below turntable 2 but above frame 24 is a member 26 having two radially extending slideways 27 and 28. A Geneva rocking arm 29 is keyed to vertical shaft or spindle 30 journalled in extension 31 of rigid frame or undertable 24. A pinion 32 in the form of a gear segment likewise keyed to spindle 30 is engaged by rack 33 adapted to be reciprocated by double-acting piston 34 in cylinder 35. Piston 34 is of well-known type having extensions of reduced diameter at each end adapted to fit in corresponding extensions in the cylinder heads so that escape of fluid from such latter extensions may be controlled to regulate and reduce the rate of movement of the piston before the latter is finally brought to a stop. Undue jarring of the mechanism is thereby avoided without hindering rapid initiation of the indexing movement. A cam roller 36 mounted at the end of arm 29 engaging the hardened wear surfaces of radial slideway 27 will obviously move inwardly along such slideway when arm 29 is rocked in a clockwise direction as viewed in Fig. 1 (whereupon it will then be in the half-way position shown in Fig. 3) and will then again move outwardly along such slideway with continued rotation of member 26 and accordingly sideway 28 in a conterclockwise direction.

A horizontal cushion cylinder 37 is carried by a vertical pivot 38 mounted on underframe 24, and a piston 39 reciprocable therein is pivotally connected to the end of arm 40 keyed to spindle 30. Consequently, when Geneva arm 29 is rocked through action of rack 33 and pinion 32, piston 39 will be reciprocated inwardly of cylinder 37 during the first half of such swinging movement of arm 29 and then outwardly during the second half of such swinging movement. Hydraulic fluid drawn into cylinder 37 during the inward stroke of piston 39 may be controlled as by means of a by-pass needle valve when expelled therefrom during the return stroke of piston 39 so as to regulate such return stroke and assist in absorbing the momentum of the moving parts acquired during the power stroke of piston 34.

It will thus be seen that the rocking of arm 29 from the position shown in Fig. 1 clockwise to move roller 36 inwardly along slideway 27 and then outwardly again to the end of such slideway will serve to oscillate member 26 and therefore slideway 28 in a clockwise direction through an arc of 72° or one-fifth of a complete revolution about the axis of strain rod 10. The means whereby such movement is utilized intermittently to rotate table 2 will now be described. Five downwardly projecting pins or studs are mounted at equally spaced intervals on the underside of table 2, such studs thus lying on lines radially of the axis of strain rod 10 72° apart. Such pins or studs will preferably be in the form of hardened rollers 41 as best shown in Fig. 2. A slide 42 is mounted for reciprocation in radial slideway 28 and is notched at its outer end to engage a roller 41 when the latter is aligned therewith. It will thus be seen that when slide 42 is in engagement with one such roller 41 and arm 29 is oscillated as above described, table 2 will thereby be caused to turn one-fifth of a revolution about its axis. Slide 42 may then be disengaged from such roller 41 to permit reciprocation of rack 33 to rock arm 29 and therefore member 26 back into starting position where slide 42 may now engage the next succeeding roller 41 for repetition of the cycle.

It is, of course, important that table 2 be locked rigidly in position during the period when slide 42 is thus out of engagement with any roller 41 and the following means is provided for this purpose. Slide or tongue 42 has a pin 43 projecting vertically downwardly therefrom and in-and-out movement of the slide is obtained by pushing and pulling on such pin. A double-acting fluid pressure cylinder 44 is mounted generally radially of table 2 with a piston 45 reciprocable therein. During the power stroke of indexing cylinder 35, such piston 45 will be back in cylinder 44 as shown in Fig. 1. The piston rod on piston 45 is pivotally connected through link means to arm 46 which is journalled for oscillation on vertical spindle 47. Another arm 48 is journalled on spindle 47 and provided with an arcuate slot 49 in which pin 43 is engaged. Outwardly projecting arms 50 and 51 integral with arms 46 and 48 respectively, have bolt holes therethrough adapted to be aligned so that such arms may be joined by bolt 52 for oscillation in unison. During set-up of the machine, it will sometimes be desired to remove such bolt in order to permit independent oscillation of arms 46 and 48. A notch 53 in the end of arm 46 is adapted to engage a roller 41 on the underside of table 2 at the end of each operating stroke of rack 33, thereby locking the table against further movement during the return stroke of the rack. As will readily be seen from a consideration of Fig. 1, when piston 45 thus acts to rock arm 46 into table-locking position arm 48 will simultaneously be rocked in a direction to withdraw slide 42 out of engagement with the same roller 41. Member 26 may now be rotated in a clockwise direction into the position shown in Fig. 1, and when piston 45 is now returned to disengage arm 46 from the corresponding roller 41, arm 48 will simultaneously be rocked to shift slide 42 outwardly into engagement with the next succeeding roller 41 (the position illustrated in Fig. 1).

A safety device is provided in the form of a curved rib or rail 54 projecting upwardly from underframe 24 and adapted to engage a downward extension 55 of pin 43. Such rib 54 is placed to ensure the positive engagement or positive disengagement of slide 42 with a corresponding roller 41 throughout the power stroke of indexing cylinder 35. Accordingly, even if locking cylinder 44 should inadvertently be reversed in its action after arm 29 has started to swing to drive the turntable, the extension 55 of pin 43 would engage the outer side of rib 54 preventing radial inward movement of slide 42 and likewise oscillation of arms 46 and 48. The respective ends of rib 54 are located to permit in-and-out movement of slide 42 only at the extreme limits of oscillation of slideway 28.

*Mold or core transporting means*

As indicated above, the apparatus here described is adapted to handle either mold flasks or core boxes, but as the particular embodiment of the invention illustrated includes a core blowing unit rather than a molding unit, the turntable will likewise be described as conveying core boxes through the cycle of operation.

The bore boxes 5 are each mounted on individual platens 56 and are not separated therefrom during operation of the machine. Such platens are, however, not permanently fixed to the turntable 2 but are provided with trunnions 57 adapted to rest in upwardly open trunnion bearings at the outer ends of arms 58 mounted on turntable 2. Such trunnions are located adjacent the outer corners of such platens as thus mounted on the supporting arms, and hardened buttons 59 at the inner corners of such platens rest upon the respective arms themselves to support the platens and core boxes in horizontal position. There are five pairs of such arms 58 adapted thus to support five platens. The indexing mechanism above described is adapted during the dwell in its cycle to leave such platens in the positions shown in Fig. 1 which may be considered as comprising five stations, station 1 being located at the core blowing unit, station 2 being intermediate such core blowing unit and the subsequent rock-over and draw station, station 3 being located at such rock-over and draw unit, and stations 4 and 5 being subsequent to the latter before return to station 1. The platens may readily be lifted from their supporting arms at each of such stations as desired and returned thereto by clamp table 18 at station 1 and by other mechanism at the other stations to be described below.

Rock-over and draw mechanism

Figure 5:
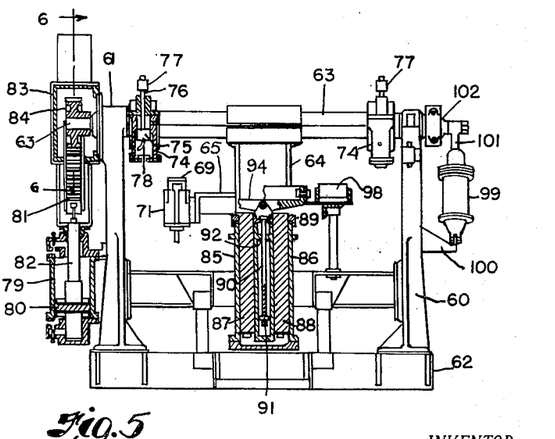
Fig. 5 is an enlarged elevational view of the rock-over and draw mechanism comprising a part of my new machine.
Figure 6:
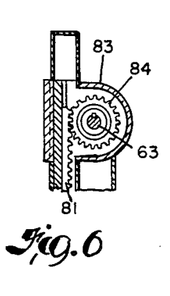
Fig. 6 is a side elevational view of a detail of the rock-over mechanism taken on the line 6—6 on Fig. 5.

The rock-over and draw mechanism generally indicated at 3 and 4 in Figs. 1 and 2 is specially designed to take core boxes or flasks from the turntable, draw the same and return them to the turntable for further indexing. Reference may additionally be had to Figs. 5 and 6 of the drawing illustrating such mechanism.

The rock-over device comprises a pair of spaced standards 60 and 61 mounted on base 62 with shaft 63 extending therebetween and journalled for rotation in their upper ends. Keyed to the central portion of such shaft is a strong rigid depending arm 64 which is offset at its lower end 65 toward the turntable 2. Such lower end portion 65 branches laterally as best shown in Fig. 1, and at the respective ends of such branches are mounted devices adapted to engage the undersides of platens 56. Horizontal shaft 63 is generally tangential to a circle centered on the axis of turntable 2 (column 10).

Such platen-engaging devices comprise sets of cleats 66 and 67 on the underside of each platen (see also Fig. 4) adapted to dovetail into reverse lips 68 and 69 of corresponding complementary cleats on the branched end 65 of arm 64. These complementary cleats on the platen and on rock-over arm 64 are arranged diagonally as best shown in Fig. 1 and generally tangential of circles centered on strain rod 10 so that they may properly interengage through the swinging movement of the platen carried by turntable 2.

Figure 4:
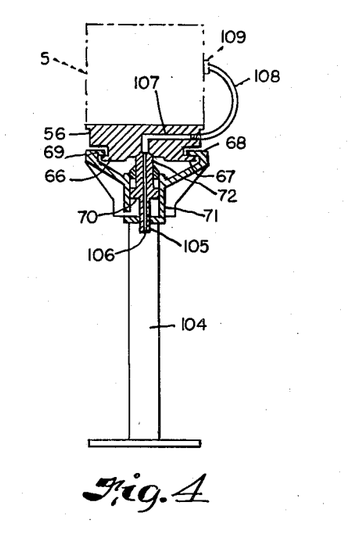
Fig. 4 is a transverse vertical section of a stand adapted to be positioned at any one of the index stations other than the blowing, molding or drawing stations and adapted for the performance of such operations as vibrating the core box, etc.

A double-acting piston 70 is adapted to be reciprocated in a cylinder 71 mounted vertically on the respective branched end portions 65 intermediate such cleats so that piston rods 72 may be forced upwardly to engage the underside of platen 56 slightly to lift the latter and bring the interengaging cleats into firmly clamped relationship. A slightly modified form of such mechanism, adapted to be located at other work stations, is shown in Fig. 4 on a somewhat larger scale. It will thus be seen that shaft 63 may now be rotated to swing arm 64 to the elevated dotted line position indicated in Fig. 2 with core box 5 held directly above the draw mechanism 4. Turntable 2 remains in the same indexed position throughout the drawing operation so that the platen and attached core box may subsequently be returned to the same set of supporting arms 58.

At the second station, subsequent to the core blowing operation but prior to the rock-over operation, drier plates 73 may be manually placed on core boxes 5. Brackets carrying double-acting cylinders 74 are keyed to shaft 63 on each side of arm 64 respectively, and pistons 75 reciprocable therein act to reciprocate piston rods 76 carrying resilient clamping arms 77 on their outer ends. Such arms will ordinarily be of spring steel and shaped and dimensioned to engage drier plates 73 to hold the same tightly against core boxes 5 when pistons 75 are urged downwardly in their cylinders 74. Pistons 75, moreover, are provided with vertically inclined cam slots 78 engaging pins protruding inwardly from the walls of cylinders 74 adapted to cause such pistons to rotate as they are reciprocated and consequently similarly to swing arms 77 from a position laterally of the core box when the piston rods are extended inwardly over the core box and drier plate 73 when such piston rods are retracted. Such cam slots are straight in their upper vertical portions so that the final clamping movement of the respective arms 77 will be in a straight downward direction against the drier plate. It will thus be seen that the drier plate will be held in place when the core box is rocked over as above described.

Shaft 63 is rotated to accomplish the rock-over through the action of mechanism comprising a double-acting cylinder 79 having a vertically reciprocable piston 80. A vertically extending rack 81 is secured to the upper end of piston rod 82 within housing 83 and engages gear 84 keyed to the reduced end of shaft 63. Piston 80 has reduced extensions adapted to enter correspondingly reduced extensions of cylinder 79 near the end of each stroke to control final movement and prevent undue jarring in well-known manner. When compressed air drives piston 80 and rack 81 upwards, pinion 84 rotates shaft 63 180° to rock the platen, core box, and drier plate out of the turntable into the inverted position over the draw mechanism as shown in dotted line in Fig. 2. When the draw mechanism has engaged the drier plate as described below, piston cylinder assemblies 75, 74 are operated to swing arms downwardly and to one side so that the draw may now take place and the rock-over mechanism subsequently be returned to starting position without interference.

The draw mechanism proper is of generally conventional construction comprising a pair of vertically disposed cylinders 85 and 86 having elongated vertically reciprocable pistons 87 and 88 therein joined at their upper ends by draw head 89. A limit pin 90 extends downwardly between such cylinders and is provided with a nut 91 adjustably threaded on its lower end and adapted to engage stop 92 to limit upward movement of the draw head. Cylinders 85 and 86 are carried on posts or columns 93 which are removable and may be replaced with posts of different lengths when necessary to obtain an adjustment of height not obtainable by means of nut 91.

Draw head 89 carries a leveling mechanism comprising a transverse member 94 pivotally mounted thereon and in turn carrying two lateral supporting members 95 and 96 pivotally connected thereto by pivots arranged at right angles to the first-named pivotal connection. When nut 91 has been properly adjusted, the admission of fluid pressure to the lower ends of double cylinders 85, 86 will then serve to elevate such draw head and leveling mechanism to bring supports 95 and 96 into engagement with the dryer plate 73 clamped to the core box suspended overhead. The joints or pivots mounting such members 94, 95 and 96 are sufficiently tight and frictional that while they will permit a sort of universal joint action on the part of the leveling mechanism when the latter engages the dryer plate to occommodate itself thereto, nevertheless the mechanism will be rigid under the forces imposed thereon during the actual draw. The draw will accordingly be in a straight line without any tendency toward wobbling or the like.

Two sets of run-out rollers 97 and 98 of well-known type are positioned to each side of draw head 89 at a level slightly above the level of supports 95 and 96 of the leveling mechanism when the draw head is sufficiently retracted. Accordingly, when the draw has been completed, the dryer plate will rest upon such rollers and the plate with the core thereon may then be manually removed or transferred to other conveyor means, etc. In such latter case, run-out rollers 97 and 98 may be slightly inclined away from the machine so that a dryer plate deposited thereon will of its own accord coast slowly onto such other conveyor means.

The draw mechanism may be arranged to draw the core entirely clear of the lower edge of the core box, but this is ordinarily not necessary since most cores will permit the core box to be rocked back into initial starting position on the supporting arms 58 when the core has been only partially withdrawn by lowering of the draw head. Arm 64 is thus returned from dotted-line to solid-line position (Fig. 2) through admission of air to the top of cylinder 79, and the platen clamp pistons 70 positively reciprocated in their double-acting cylinders to allow the platen 56 once again to rest on the respective pair of arms 58.

A cushion cylinder 99 is provided to assist in reducing shock at the termination of each rock-over operation, such cylinder being pivotally connected at its lower end to bracket 100 on rock-over frame 60 and having a piston reciprocable therein with an upwardly extending piston rod 101 pivotally connected to the end of crank arm 102. Line pressure is applied to the lower end of cylinder 99 at all times, and crank 102 is keyed to an extension of shaft 63. Consequently, for the first 90° of crank rotation, such cylinder serves to assist in rocking the core box and platen assembly. On the last 90° of crank rotation, however, when the weight of such core box and platen assembly tends to accelerate, it serves as a snubber due to the entrapment of air in such cylinder through action of a check valve at the inlet orifice 103. The position of rock-over arm 64 is, however, positively controlled by cylinder 79 as above described.

The intermediate stations

As shown in Fig. 1 of the drawing, a rest station is provided intermediate the bore blowing station and the rock-over and draw station (the turntable rotating in a counterclockwise direction), and two stations are likewise provided for the platen after the draw operation before the platen is returned to the bore blowing station.

Means may be provided at the station immediately prior to the draw station for application of compressed air into the core box to remove loose pieces or vents and thus prepare the core for the drawing operation. Referring more particularly to Fig. 4 of the drawing, a stand 104 may be provided at such station carrying sets of cleats 68 and 69 similar to those on rock-over arm 64, but in this case stationary. Pistons 70 in cylinders 71 at this station are operative when air is admitted to such cylinders to engage the underside of a platen 56 to elevate the latter slightly firmly to interengage such dovetail cleats 66 and 67 with such cleats 68 and 69 carried by the stand. Pistons 70 are provided with rods 105 cored to afford axial passages 106 therethrough opposed to the orifice of passage 107 in such platen. A flexible tube 108 leading from such latter passage is adapted to be connected to a vibrator 109 secured to the side of core box 5 or, alternatively, to be connected to cylinders in such core box arranged to displace loose pieces, vents and the like in known manner when air under pressure is admitted through passage 106. Of course, the operator may manually remove such loose pieces, etc., at this station if desired.

The end of piston 70 engaging the underside of the platen is tapered and adapted to enter a corresponding recess in the platen from which passage 107 leads. The piston therefore also serves both as a final precise positioning means for the platen and a form of latch when fully inserted.

At the two stations immediately following the draw station, similar stands may be provided where the empty core box may be inspected and, if necessary, cleaned by the operator and again made ready for the blowing operation before being indexed into the blowing machine. Thus, for example, a parting agent may be applied, loose pieces and vents inserted, and support wires placed in position.

The number of stations to be provided is a matter of choice with the size of the turntable and the regulation of the indexing mechanism being modified as necessary. Other compounds than the usual foundry sand can be utilized, and the method and apparatus are adapted to the production of cores, molds and other articles of wide variety.

Operation and control

Figure 7:
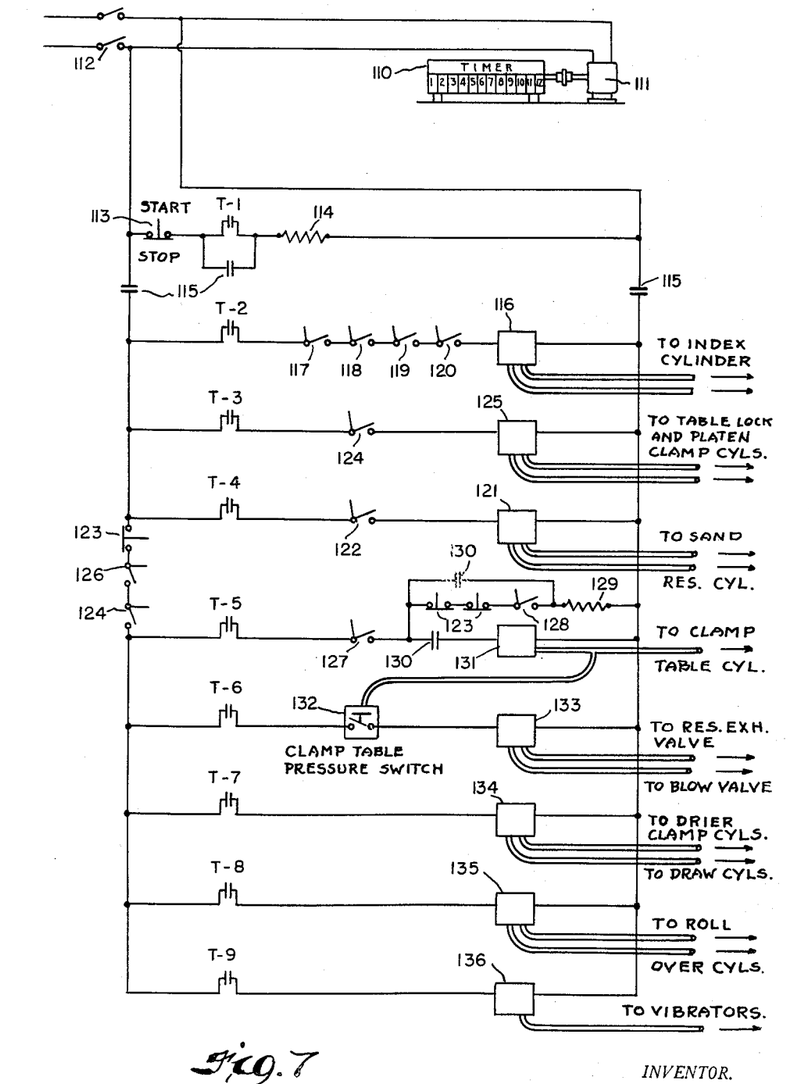
Fig. 7 is a schematic diagram of the automatic control system for my new machine.

As illustrated in Fig. 7, I provide an electrical control system for my new machine in order automatically to coordinate each separate operation which must be performed in proper sequence. Means is provided whereby the turntable, rock-over mechanism and the core blower may each be operated separately during set-up, for example. Moreover, the core blower and turntable may be operated together with operation of the other mechanism, and the rock-over mechanism and turntable may likewise be jointly operated. To prevent possible damage to the machine, all important operations are protected by limit switches or pressure switches properly placed on the machine. Should the control timer be improperly adjusted or should an operation take longer than anticipated, the electrical circuit which would next be completed to initiate a subsequent operation will be broken by a protecting limit switch.

Figure 7 is a schematic control diagram for the machine and shows a timer 110 adapted to be driven by electric motor 111 when main switch 112 is closed. This timer may be of the well-known cam type driven continuously by motor 111 and adapted to open and close electrical contacts T-1, T-2, T-3, T-4, T-5, T-6, T-7, T-8 and T-9 at predetermined intervals. Additional circuits for special purposes may be added utilizing timer contacts T-10, T-11 and T-12. A number of solenoid valves are provided adapted to be energized by closing of such contacts to admit air pressure to the various cylinders, etc.

The control system will be best understood through an explanation of the operation of the machine through one complete cycle. After the machine has been properly set up with the core boxes mounted on the platens and the core blowing and draw mechanisms properly adjusted, the main switch 112 will be thrown to start operation of the timer 110. The operator then presses start button 113 and when contact T-1 of the drum switch timer 110 is now closed by the latter, current will now flow through the coil of control relay 114 to close the latter's contacts 115. Such contacts will remain closed thereafter due to the holding circuit and will permit current to flow to all of the other timer contacts. It is thus seen that the cycle cannot start until contacts T-1 close and the point in the sequence of operation where the cycle begins is thus positively determined. Contacts T-2 are next closed by timer 110 and current will thus reach solenoid valve 116 to admit air to the left-hand end of indexing cylinder 35 (as viewed in Fig. 1) to cause table 2 to be indexed one station. Solenoid valve 116 cannot, however, thus be energized unless protecting limit switches 117 and 118 have been closed by the lower ends of pistons 70 retracted to unclamped position when rock-over arm 64 is in solid line position as viewed in Fig. 2. Moreover, limit switch 119 must be closed by retraction of lock arm 46 out of engagement with a pin 41 (Fig. 1) and limit switch 120 must be closed by core blower table 18 in its lowermost position.

The sand reservoir 13 may desirably be shifted from the blow position to the fill position below hopper 14 and back again during the indexing interval in order to conserve time. For this reason, contact T-4 will be closed and opened by timer 110 during such interval. Current will thus reach solenoid valve 121 first to admit air to the left-hand end of cylinder 12 to shift the reservoir into fill position and then to the right-hand end of cylinder 12 to return such reservoir to blow position. Solenoid valve 121, however, cannot be thus energized until limit switch 122 has been closed by clamp table 18 as it approaches its lowermost position. It will thus be seen that table 2 has been indexed once (one-fifth of a revolution) while the sand reservoir has been shuttled once.

If the core blower and rock-over stop button has not already been pressed to close switch 123, the operator will now press the same and the valves which operate the core blower and rock-over draw mechanism can be energized. When limit switch 124 has been closed by indexing of table 2 exactly one-fifth of a revolution, switch 124 being conveniently mounted on a bracket on the fixed base closely adjacent the turntable where it may be sequentially actuated by five lugs on such turntable corresponding to the five work stations, and contact T-3 closed by timer 110, solenoid valve 125 will be energized to admit air under pressure both to cylinder 44 to rock arm 46 to engage a pin 41 on table 2, and also to admit air to the cylinders 71 of the platen clamping mechanism on rock-over arm 64 to clamp the platen now dovetailed at the rock-over station.

When arm 46 is thus swung into table-locking position, it again opens limit switch 119 but closes limit switch 126. Since limit switch 124 has already been closed as above described, closing of contacts T–5 by timer 110 will permit current to flow through limit switch 127 (closed by return of said reservoir 13 to the blow position) through contacts closed by switch 123 and through limit switch 128 which is mounted on a bracket on base 6 adjacent table 18 and adapted to be engaged and closed by a cleat on the underside of a platen when the latter is in position for vertical clamping. Accordingly, if no platen should be thus delivered above table 18 no blow will take place, and the cycling will continue. This energizes the coil of relay 129 to close contacts 139 to energize solenoid valve 131 to admit air pressure below piston 16 in vertical clamping cylinder 17. Such vertical clamp piston 16 accordingly now rises carrying with it the platen 56 resting on table 18 until core box 5 has been brought into firm clamping engagement with blow plate 19. The clamp pressure switch 132, connected to the air line leading to cylinder 17, is adjusted so that when sufficient clamping pressure has been reached it will be closed, and when timer 110 has also closed contacts T–6 the four-way solenoid operated valve 133 will be shifted to relieve the air pressure on the diaphragm of the usual diaphragm valve in the blow head 15 to cause the latter valve to admit air to the blow head to blow the core. When T–6 now again opens, the spring-returned solenoid operated valve 133 will admit air against the diaphragm of the blow valve to close the latter and terminate the blow, and simultaneously relieve the air pressure which has been holding reservoir exhaust valves 20 and 21 closed so that they may now exhaust the reservoir (see Ellms Patent No. 2,545,944).

After the reservoir has been thus exhausted, timer 110 will open contacts T–5 to de-energize valve 131 (and connect cylinder 17 to relief) so that contacts 130 are opened and piston 16 lowered, returning the platen 56 to its supporting arms 58 on turntable 2.

Simultaneously with the blowing of the core as above described, timer 110 acts to close contacts T–7 to energize solenoid valve 134 to admit air to cylinders 74 and thereby bring clamping arms 77 into clamping engagement with the drier plate 73 on the core box at the rock-over station. Valve 134 likewise admits air under pressure to the lower ends of draw cylinders 85 and 86 to raise the draw head and leveling mechanism carried thereby into position to engage such drier plate when the core box is now inverted. (It will be recalled that the platen at this station has already been firmly secured to rock-over arm 64 through action of pistons 70.)

Timer 110 now closes contacts T–8 to energize solenoid valve 135 to admit air to the lower end of rock-over cylinder 79. Arm 64 is therefore swung to dotted line position as shown in Fig. 2 with drier plate 73 engaged by the waiting draw head and leveling mechanism supported by pistons 87 and 88. The contacts T–9 will ordinarily be set to be closed by timer 110 at this time to energize solenoid operated valve 136 to admit air through passages 106, 107 and tube 108 to operate the usual vibrators in well-known manner. Depending upon the particular type of core being made, however, and the particular type of core box employed, such air pressure may be utilized for the automatic withdrawal of loose pieces, etc. As tubular piston rods 70 may be provided to engage with complementary passages at either end of the platen, one set may be utilized to admit air to vibrate the core box and withdraw loose pieces at the draw station and the other set at a following station 4 or 5 to admit air to return such loose pieces. The timer will open contacts T–7 to de-energize solenoid valve 134, thereby connecting the lower ends of draw cylinders 85 and 86 to relief and admitting air to the other ends of cylinders 74 to swing drier plate clamping arms 77 back out of the way. When the draw has been completed, contacts T–8 will open, reversing valve 135 to admit air to the upper end of cylinder 79 and thereby return the platen and core box to starting position. As soon as contacts T–3 open to admit air to cylinder 44 to return piston 45 and disengage arm 46 with locking pin 41 on index table 2, cylinders 71 on arm 64 will likewise be positively reciprocated rapidly to lower platen 56 down upon the waiting arms 58. It will thus be seen that one complete cycle of operation has been performed and will now be automatically repeated unless one of the manually operated stop switches is opened.

It will be seen from the foregoing that I have provided a machine adapted to produce uniform cores at a very high rate of speed and with a minimum of supervision. One such machine now in use has shown itself capable of producing well over 400 cores per hour, a rate previously unheard of, and of making long production runs at a rate of 370 cores per hour. It is desirable to employ dry air to eliminate the possibility of moisture freezing in the needle valves and the like. By preparing another set of platens with appropriate core boxes it is possible to shift to a new job simply by substituting such new platens on the turntable and making the usual adjustments in the blowing and draw mechanisms. If the same size (or nearly the same size) core box is employed, then it may be entirely feasible to blow several different forms of cores in succession on the machine without intercession by the operator.

When employing a plurality of my new machines it is desirable to arrange the same in pairs both to facilitate supervision and to economize floor space and associated equipment such as conveyors. Such arrangement is especially suitable in view of the fact that the turntables of each pair may be caused to index in opposite directions. While turntable 2 has been described above as indexing in a counterclockwise direction, an inspection of Fig. 1 will show that it may readily be indexed in a clockwise direction by locking a pin (roller) 41 with latch 46 when piston 34 and rack 33 move to the right and releasing latch 46 and engaging latch 42 when rack 33 is reciprocated to the left. Such reversal is conveniently obtained by reversing the air line connections to the respective ends of cylinder 35.

An important feature of my invention is the manner in which the platens and associated core boxes are picked up at the blow and draw stations and then again returned to the turntable. This mode of operation has proven much superior to methods utilizing core boxes or platens mounted for rotation on trunnions of their own. At both the mold-making and draw stations the initial movement of the platen is vertically upward although at the draw station this movement may be short, on the order of three-sixteenths of an inch or so, before commencing the rocking action. There is thus no interference between the trunnions and their cradles. Of course, it will readily be seen that mold flasks may be employed instead of core boxes and a molding machine such as the well-known Osborn model 218–PV vibrating squeeze machine substituted for the core blowing machine. Jolt squeeze molding machines are also adaptable for such purpose. The platens may conveniently be mounted on the turntable by first inserting the trunnions in the respective cradles and then swinging the platen with the core box or flask mounted thereon up and onto the turntable. They may be removed in reverse manner or, if it is merely desired to dump a poor mold, the platen may be swung on its trunnions to inverted position and then returned to upright position. Adjusting screws may be provided to engage the undersides of buttons 59 to obtain a precise leveling of the platens on their supporting arms.

With my novel platen construction it is possible firmly to grip the same at the rock-over and intermediate stations and to apply compressed air to operate vibrators or other accessories as desired. A power-operated vent rod may be inserted into and withdrawn from the core box at the blow station. At the second station the core box will be vibrated, pattern inserts withdrawn, and a drier plate placed on the box either manually or automatically. At the third (draw) station the core box will be vibrated. As indicated, pneumatic vibrators, particularly of the reciprocating piston type, are commercially available and have long been employed in the industry. They may be mounted on the core box or flask, or less desirably, directly on the platen. At the fourth station the pattern inserts will be returned, the operator will cean out loose sand with an air nozzle, and a parting fluid will be sprayed on the pattern. These latter operations may readily be made automatic by utilizing timer-controlled air jets and spray nozzles. At the fifth station a final blow-out operation will be performed to remove excess parting fluid and any remaining loose sand. When blowing several different types of cores in succession, correspondingly appropriate tops may be placed on the respective core boxes at the fourth or fifth station or at the blow station, either manually or, at the blow station, by means of special mechanism.

While a true turntable or turret as shown and described is much preferred for many reasons, certain benefits of my invention may also be obtained when utilizing a loop conveyor adapted to be indexed from station to station, carrying similar platens. The turntable, however, enables me more easily to obtain the necessary degree of precision.

When timer 110 has run through a complete cycle as above described, contacts T–1 will open but the holding circuit maintains contacts 115 closed until the operator pushes the "stop" button. Contacts T–2 being again open, valve 116 will have admitted air pressure to the right-hand end of cylinder 35 (Fig. 1) immediately after indexing and operation of the table lock. Contacts T–3 are open so that piston 45 is back with arm 46 consequently in unlatched position. Contacts T–4 are open so that sand reservoir 13 remains in the blow position. Similarly, the other timer contacts are open so that piston 16 is down, the reservoir exhaust valves open, the draw head 89 is down, the rock-over arm 64 in solid line position (Fig. 2), and the core box vibrators inactive. As timer 110 continues to turn, a new cycle now begins.

It will be noted that there are two sets of cleats on the underside of each platen adapted to engage complementary cleats at the rock-over and other stations. These cleats on the platens will be spaced far enough apart to avoid interfering with clamping table 18 and will also be spaced inwardly from the respective ends of the platen to avoid turntable arms 58. At intermediate stations where automatic pneumatic vibrating, etc., may be desired the stands 104 will support one or two sets of cleats similar to those on rock-over arm 64.

While the terms "core" and "mold" are usually accorded limited meanings in the industry a core is, of course, a special type of mold and in the claims appended hereto the term "mold" is used in its broad significance to include cores and the like as well as the usual molds as produced in squeeze molding machines, for example. The mold-enclosing means, such as a flask or core box, is also known in a variety of forms. As a matter of fact, it is feasible to blow many types of molds, as commonly so named, on the core blowing machine, or the blow plate may be utilized merely as a squeeze head for the squeezing of molds in cooperation with table 18. Of course, a regular jolt-squeeze or other standard molding machine would ordinarily be preferred.

Other modes of applying the principle of the invention may be employed, change being made as regards the details described, provided the features stated in any of the following claims or the equivalent of such be employed.

I therefore particularly point out and distinctly claim as my invention:

1. In core making mechanism including a core blowing machine having a vertically reciprocable table, a blow head spaced above such table, and a sand reservoir adapted to be reciprocated laterally from a filling station to a blowing station between such blow head and table; a turntable mounted for rotation about a vertical axis adjacent such machine, geneva indexing means operative to index said turntable 72° between stops, thereby affording five stations about said turntable, said vertically reciprocable table being positioned at one such station, five pair of spaced arms extending laterally from said turntable, the arms of each pair being positioned to embrace a corresponding station when said turntable is at rest, a platen for each said pair of arms adapted to be supported by the latter for elevation therefrom and return thereto, a core box securely mounted on each said platen, said arms being adapted to support said platen and core box above such vertically reciprocable table when the latter is in lowered position, whereby reciprocation of such latter table is operative to lift said platen to bring said core box into blowing position beneath such reservoir and then to lower said platen again upon its corresponding pair of supporting arms after the blow; and core drawing means at a subsequent station comprising an arm mounted for swinging movement about a horizontal axis generally tangential to a circle centered on the axis of said turntable, the end of said swinging arm being adapted to extend beneath a platen supported by said turntable, cleats on said swinging arm and complementary cleats on the underside of each said platen adapted to dovetail therewith, clamping means on said swinging arm adapted to engage the underside of said platen to force said dovetailed cleats firmly together to hold said platen on said swinging arm, power means operative to rock said swinging arm through an arc of 180° to lift said platen and support the same in inverted position, clamping means operative to clamp a drier plate on the core box mounted on said platen prior to thus inverting the same, and a vertically reciprocable draw table adapted to engage such drier plate in inverted position and then, after release of said last-named clamping means, to descend to draw the core, whereupon said swinging arm may be rocked to return said platen and core box to starting position and said first-named clamping means released to return said platen to said turntable arms.

2. In core making mechanism including a core blower having a base, a column mounted on such base, a blow head supported by such column, a vertically reciprocable clamping table mounted in such base below such blow head, and a sand reservoir mounted for reciprocation laterally from a filling station to a blowing station between such blow head and table; a turntable mounted for rotation about such column, geneva indexing means operative to index said turntable 72° between stops, thereby affording five stations about said turntable, said vertically reciprocable clamping table being situated at one such station, five pair of spaced arms extending laterally from said turntable and having upwardly open trunnion bearings near their outer ends, the arms of each pair being positioned substantially to embrace a corresponding station when said turntable is at rest, a platen for each said pair of arms adapted to be supported thereon for elevation therefrom and return thereto, trunnions on said platens adapted to be received in such trunnion bearings on said arms, a core box securely mounted on each said platen, said arms being adapted to support a said platen and core box above such vertically reciprocable table when the latter is in lowered position, whereby reciprocation of such latter table is operative to lift said platen to clamp said core box in blowing position beneath such reservoir and then to lower said platen again upon its corresponding pair of supporting arms after the blow; and core drawing means at a subsequent station comprising an arm mounted for swinging movement about a horizontal axis generally tangential to a circle centered on such column, the end of said swinging arm being adapted in one position to extend beneath a platen supported by said turntable arms at such station, cleats on said swinging arm and complementary cleats on the underside of each said platen adapted to dovetail therewith when a said platen is brought to such last-named station by rotation of said turntable, clamping means on said swinging arm comprising a fluid pressure piston-cylinder assembly mounted for engagement of the underside of said platen by said piston to force said respective dovetailed cleats firmly together to hold said platen on said swinging arm, a pneumatic vibrator on said core box, an axial passage through said piston, a passage through said platen leading to said vibrator and having an orifice opposed to a corresponding orifice of said passage through said piston when the latter is thus in clamping engagement with said platen, whereby air under pressure may be introduced through said piston to operate said vibrator, power means operative to rock said swinging arm through an arc of 180° to lift said platen and support the same in elevated inverted position on the other side of such horizontal axis, clamping arms swingable with said swinging arm and also laterally swingable into and out of position to clamp a drier plate on said core box prior to thus inverting the latter together with its platen, and a vertically reciprocable draw table adapted to engage such drier plate in inverted position and then, after lateral swinging of said clamping arms out of interfering position, to descend with such drier plate and core supported thereon, whereupon said swinging arm may be rocked to return said platen and core box to starting position and said clamping piston retracted to release said platen to its waiting turntable arms.

3. In core making mechanism including a core blowing machine having a vertically reciprocable table, a blow head spaced above such table, and a sand reservoir intermediate such blow head and table; a turntable mounted for rotation about a vertical axis, indexing means operative to index said table to afford a plurality of rest stations thereabout, such vertically reciprocable table being situated at one such station, pairs of spaced arms extending laterally from said turntable, the arms of each pair being positioned substantially to embrace a corresponding station when said turntable is at rest, a platen adapted to be removably supported on a said pair of arms for elevation therefrom and return thereto, a core box securely mounted on said platen, said arms being adapted to support said platen beneath such reservoir and above such vertically reciprocable table when the latter is in lowered position, whereby reciprocation of such latter table is operative to lift said platen to clamp said core box in blowing position beneath such reservoir and then to lower said platen again upon its corresponding pair of supporting arms after the blow; and core drawing means at a subsequent station comprising a member mounted for swinging movement about a horizontal axis generally tangential to a circle centered on said turntable axis, clamping means on said member operative to grip said platen resting on said arms, power means operative to rock said member through an arc of 180° about such horizontal axis to lift said platen and support the same in elevated inverted position on the other side of such horizontal axis, clamping means swingable with said member operative to clamp a drier plate on said core box prior to thus inverting the latter with said platen, and a vertically reciprocable draw table adapted to engage such drier plate in inverted position and then, after release of said last-named clamping means, to descend to draw the core, whereupon said member may be rocked to return said platen and core box to starting position and said first-named clamping means deactivated to release said platen to said turntable arms.

4. In mold making mechanism including a molding machine having a vertically reciprocable table adapted to elevate a flask or core box, a turntable mounted for rotation about a vertical axis, pairs of spaced arms extending laterally from said turntable and generally defining work stations therebetween when said turntable is at rest, such vertically reciprocable table being situated at one such station, indexing means operative to index said turntable from station to station, platens adapted to rest upon said arms and to have flasks and core boxes mounted thereon, said arms being adapted to support a said platen above such vertically reciprocable table for elevation of said platen by the latter for performance of the molding operation and return to said arms by lowering of such table after completion of the molding operation; and mold drawing means at a subsequent station comprising a member mounted for swinging movement about a horizontal axis generally tangential to a circle centered on said turntable axis, clamping means on said member operative to grip a said platen resting on said arms to such station, power means operative to swing said member through an arc of 180° about such horizontal axis to invert said platen and the flask or core box mounted thereon, and a vertically reciprocable draw table positioned radially outwardly of said turntable beneath said swinging member in the outer position of the latter adapted to support the mold after release of the latter and to descend to draw the same, whereupon said member may then be swung back to return said platen to said turntable arms.

5. In mold making mechanism including a molding machine having a vertically reciprocable table adapted to elevate a flask or core box, a turntable mounted for rotation about a vertical axis, platen-supporting means on said turntable adapted to support a plurality of platens arranged about its periphery, a plurality of work stations adjacent said turntable, indexing means operative to turn said turntable to index such platens from station to station, such vertically reciprocable table being situated at one such station and said platen-supporting means being adapted to support a platen above said vertically reciprocable table for elevation by the latter for performance of the molding operation; and mold drawing means at another such station comprising means operative to engage such platen to elevate and invert the latter in a region spaced radially outwardly from said turntable, and a draw table mounted for vertical reciprocation beneath such platen where held in such inverted position by said mold inverting means.

6. In mold making mechanism, a turntable mounted for rotation about a vertical axis, a molding station adjacent said turntable, a mold drawing station adjacent said turntable, platen-supporting means on said turntable adapted to support a plurality of platens arranged circumferentially thereof, indexing means operative to rotate said turntable to index such platens from said molding station to said draw station and from the latter station to said molding station, said platen-supporting means being arranged to support one platen at said draw station when another platen is thus supported at said molding station, molding means at said molding station operative to lift a platen from said supporting means for performance of the molding operation and to return the same thereto after completion of such operation, rock-over means at said draw station operative to lift a platen from said supporting means and invert the same, and a draw table mounted for vertical reciprocation beneath such platen where thus held in such inverted position by said rock-over means.

7. In mold making mechanism, a turntable mounted for rotation about a vertical axis, a molding station adjacent said turntable, a mold drawing station adjacent said turntable, platen-supporting means on said turntable adapted to support a platen laterally thereof, indexing means operative to turn said turntable to index such platen from said molding station to said draw station and from the latter station to said molding station, rock-over means at said draw station operative to lift a platen from said supporting means and invert the same, and draw means operative to support a mold where thus inverted with such platen by said rock-over means for relative vertical movement of such platen and mold to draw the latter.

8. In combination, a turntable mounted for rotation about a vertical axis, pairs of spaced arms extending laterally from said turntable and generally defining work stations therebetween when said turntable is at rest, indexing means operative to index said turntable from station to station, platens adapted to rest upon said arms and to have flasks and core boxes mounted thereon, and mold drawing means comprising a member mounted for swinging movement about a horizontal axis generally tangential to a circle centered on said turntable axis, clamping means on said member operative to grip a said platen resting on said arms at such station, power means operative to swing said member through an arc of 180° about such horizontal axis radially outwardly of said turntable to invert said platen and the flask or core box mounted thereon, and a vertically reciprocable draw table positioned radially outwardly of said turntable beneath said swinging member on the outer position of the latter adapted to support the mold after release of the latter and to descend to draw the same, whereupon said member may then be swung back to return said platen to said turntable arms.

9. In combination, a turntable mounted for rotation about a vertical axis, platen-supporting means on said turntable adapted to support a platen laterally thereof, a platen, pattern means rigidly secured to said platen, indexing means operative to turn said turntable with a dwell period at a draw station, rock-over means at such draw station mounted for swinging movement about an axis spaced outside the periphery of said turntable and said supporting means operative to clamp and lift a platen from said supporting means and invert the same, and draw means positioned radially outwardly of said turntable beneath said rock-over means in the outer position of the latter operative to support a mold inverted with said platen for relative vertical movement of said platen and mold to draw the latter, said rock-over means being operative continuously thus to clamp said platen until the latter has been returned by it to said platen supporting means on said turntable.

10. In combination, a platen conveyor operative to transport platens in a horizontal position from station to station with dwells at such stations, such platens being adapted to carry mold-enclosing means mounted thereon, rock-over means at one such station operative to clamp and lift a platen from said conveyor and invert the same, and draw means positioned beneath said rock-over means operative to support a mold inverted with such platen for relative vertical movement of such platen and mold to draw the latter, said rock-over means being operative to clamp said platen until the latter has been returned by it to said platen conveyor.

11. Rock-over and draw mechanism for core blowing machines and the like comprising two spaced stands, a horizontal shaft journalled in the upper end portions of said stands for rotation about its axis, a depending arm mounted on said shaft for swinging movement therewith intermediate said respective stands, a normally horizontally projecting end portion of said arm having two spaced sets of dovetail cleats thereon adapted to interengage complementary sets of cleats on the underside of a platen, a fluid pressure piston-cylinder assembly mounted on said end portion of said arm intermediate such cleats of each such set, said piston of said assembly being operative forcibly to engage the underside of such platen to bring the interengaged dovetailed cleats firmly together to secure such platen on said arm; a gear keyed to one end of said shaft, a longitudinally reciprocable rack engaging said gear, a double-acting fluid pressure piston-cylinder assembly operative to reciprocate said rack to turn said gear and shaft through an arc of 180° and thereby invert such platen, a crank keyed to the other end of said shaft, a fluid pressure piston-cylinder assembly pivotally mounted at one end on the adjacent said stand and operatively connected with said crank, said last-named assembly being adapted to have fluid pressure continuously applied thereto to urge said crank to rock said arm upwardly until the mass of said arm, platen, and core box or flask on said platen is directly above said shaft; clamping means adapted to hold a drier plate against such core box or flask comprising two parallel fluid pressure cylinders mounted on said shaft for rotation therewith adjacent said respective stands, pistons reciprocable in said latter cylinders, piston rods extending from said latter cylinders, resilient clamping arms mounted on said respective rods and adapted to extend over and engage such drier plate when said latter pistons are retracted, cam means adapted to swing said clamping arms laterally of such drier plate when said latter pistons are reciprocated to unclamp such plate; and a vertically reciprocable draw table adapted to engage such drier plate in inverted position and then, after lateral swinging of said clamping arms into inoperative non-interfering position, to descend with such drier plate and core or mold supported thereon, whereupon said shaft and platen-carrying arm may be rocked to return such platen to starting position.

12. Rock-over and draw mechanism for mold making machines and the like comprising a member mounted for swinging movement about a horizontal axis, cleats on said member adapted to dovetail with complementary cleats on the underside of a mold-supporting platen, pressure means on said member adapted to engage the underside of such platen to force such dovetailed cleats firmly together to hold such platen on said member, power means operative to rock said member through an arc of 180° to invert such platen and support the latter in inverted position; clamping means adapted temporarily to hold a drier plate against a core box or flask mounted on such platen comprising two parallel fluid pressure cylinders mounted for swinging movement with said member, pistons reciprocable in said respective cylinders, piston rods extending therefrom, clamping arms secured to said respective rods and adapted to extend over and engage such drier plate, and cam means adapted to swing said respective arms in over such drier plate when said pistons are reciprocated to move said arms into clamping engagement therewith and to swing said arms laterally outwardly of such drier plate when said pistons are reciprocated to move said arms out of clamping engagement therewith; and a vertically reciprocable draw table adapted to engage such drier plate in inverted position and then, after lateral swinging of said clamping arms into inoperative non-interfering position, to descend with such drier plate, whereupon said member may be rocked to return such platen to starting position.

13. In rock-over and draw mechanism for mold-making machines and the like, a member mounted for swinging movement about a horizontal axis, cleats on said member adapted to dovetail with complementary cleats on the underside of a mold-supporting platen, pressure means on said member adapted to engage the underside of such platen to force such dovetailed cleats firmly together to hold such platen on said member, power means operative to rock said member through an arc of 180° to invert such platen and support the latter in inverted position, and draw means operative and positioned to support a mold inverted with such platen for relative vertical movement of such platen and mold to draw the latter.

14. In rock-over and draw mechanism for mold making machines and the like, a member mounted for swinging movement about a horizontal axis, clamping means on said member operative to grip a horizontal platen, power means operative through an arc of 180° to invert such platen and support the latter in inverted position; clamping means adapted temporarily to hold a drier plate against a core box or flask mounted on such platen comprising two parallel fluid pressure cylinders mounted for swinging movement with said member, pistons reciprocable in said respective cylinders, piston rods extending therefrom, clamping arms secured to said respective rods and adapted to extend over and engage such drier plate, and cam means adapted to swing said respective arms in over such drier plate when said pistons are reciprocated to move said arms into clamping engagement therewith and to swing said arms laterally outwardly of such drier plate when said pistons are reciprocated to move said arms out of clamping engagement therewith; and draw means operative and positioned to support a mold inverted with such platen for relative vertical movement of such platen and mold to draw the latter.

15. In rock-over and draw mechanism for mold making machines and the like, a member mounted for swinging movement about a horizontal axis, vertically reciprocable clamping means on said member spaced from such axis operative to clamp a horizontal platen positioned wholly laterally of such axis, power means operative to actuate said clamping means, power means operative releasably to rock said member bodily to invert such platen, and draw means positioned beneath said swinging member operative to support a mold inverted with such platen for relative vertical movement of such platen and mold to draw the latter.

16. In rock-over and draw mechanism for mold making machines and the like, a member mounted for swinging movement about a horizontal axis, clamping means on said member operative to grip a horizontal platen, power means operative through an arc of 180° to invert such platen and support the latter in inverted position; clamping means adapted temporarily to hold a drier plate against a core box or flask mounted on such platen comprising two clamping arms mounted for swinging movement with said member and adapted to extend over and engage such drier plate, power means operative to move said arms into and out of clamping position, and means adapted to swing said respective arms in over such drier plate when said arms are moved toward clamping position and to swing said arms laterally outwardly of such drier plate when said arms are moved out of clamping position.

17. Platen supporting means comprising a support, a platen having cleats on its underside, complementary cleats on said support adapted loosely to dovetail with cleats on the underside of said platen, a fluid pressure piston-cylinder assembly on said support normal to a platen positioned thereon operative to engage the underside of said platen and lift the latter firmly to interengage said dovetailed cleats to secure such platen on said support.

18. In combination, a platen having dovetail cleats on its underside, supporting means having cleats adapted to interengage said first-named cleats, and a fluid pressure piston-cylinder assembly on said supporting means normal to the underside of such a platen interengaged therewith, said assembly including a piston reciprocable to engage the underside of said platen firmly to hold the latter thus interengaged, said piston having a fluid inlet passage axially therethrough and said platen having a passage therethrough with one end located to oppose such passage through said piston, whereby, when said platen is thus held firmly by said supporting means, a fluid medium may be introduced through such passages to operate devices carried by said platen.

19. In apparatus including a platen, supporting means for said platen, and clamping means operative releasably to clamp said platen to said supporting means; said clamping means being on said supporting means and comprising a piston reciprocable to engage said platen to clamp the same, a passage generally axially through said piston adapted to be connected at one end to a fluid pressure source, a passage through said platen having one end located to oppose such passage through said piston, and a fluid pressure operated device carried by said platen connected to said passage in said platen for operation by fluid pressure therein.

20. In apparatus including a platen, supporting means for said platen, and clamping means operative releasably to clamp said platen to said supporting means; said clamping means being on said supporting means and comprising a piston reciprocable to engage said platen to clamp the same, a passage generally axially through said piston adapted to be connected at one end to a pneumatic pressure source, a passage through said platen having one end located to oppose such passage through said piston, mold-enclosing means on said platen, and a pneumatic vibrator on said mold-enclosing means connected to said passage in said platen for operation by air under pressure therein.

21. In apparatus including a platen, supporting means for said platen, and clamping means operative releasably to clamp said platen to said supporting means; coaxial passages in said platen and clamping means respectively for introduction of fluid under pressure to devices on said platen when the latter is clamped and held by said clamping means, and a fluid pressure inlet to said passage in said clamping means.

22. In combination, a platen, platen clamping means, mold-enclosing means carried by said platen, a pneumatic vibrator on said mold-enclosing means, opposed passages through said clamping means and platen respectively for introduction of air under pressure to said vibrator when said clamping means has engaged said platen, and a fluid pressure inlet to said passage in said clamping means.

23. In combination, a normally horizontal platen having cleats on its underside, a support having complementary cleats adapted loosely to dovetail with said cleats on the underside of said platen, and a fluid pressure piston-cylinder assembly on said support normal to said platen positioned thereabove including a piston reciprocable to engage the underside of said platen to lift the latter firmly to interengage said dovetailed cleats, said piston having a tapered end and said platen having a corresponding recess in its underside adapted to receive said end for final automatic positioning and locking of said platen.

24. In combination, a normally horizontal platen having cleats on its underside, a support having complementary cleats adapted loosely to dovetail with said cleats on the underside of said platen, said platen having a recess in the underside thereof, and a locking member mounted on said support adapted to enter such recess and engage said platen to prevent transverse movement of said platen relative to said support and also to urge said dovetailed cleats firmly together.

25. In combination, a normally horizontal platen adapted to have a core box or the like mounted thereon, a set of cleats on the underside of said platen, a support having complementary cleats adapted loosely to dovetail with said cleats on the underside of said platen through lateral movement of the latter relative to said support, and a fluid pressure piston-cylinder assembly mounted on said support normal to a said platen positioned thereabove including a piston reciprocable to engage the underside of said platen to lift the same firmly to interengage said dovetailed cleats, said piston having a tapered end and said platen having a corresponding recess in its underside adapted to receive said end for final automatic positioning and locking of said platen, said piston also having a fluid inlet passage axially therethrough and said platen having a passage therethrough leading to such recess, whereby, when said platen is thus held firmly by said supporting means, a fluid medium may be introduced through such passages to operate devices carried by said platen.

26. In combination, a normally horizontal platen adapted to have a core box or the like mounted thereon, separate supporting means for said platen, means operative releasably to secure said platen on said support, and a piston mounted in said support for reciprocation into and out of engagement with said platen, said platen having a corresponding recess therein adapted to receive the end of said piston, and said piston having a fluid inlet passage longitudinally therethrough and said platen having a passage therethrough leading from such recess, whereby, when said platen is thus held firmly by said supporting means, a fluid medium may be introduced through such passages to operate devices carried by said platen.

27. In combination, a turntable mounted for rotation about a vertical axis, means on said turntable adapted to support a plurality of platens in horizontal position laterally of such axis, platens adapted to rest on said supporting means, indexing means operative to rotate such turntable to move said platens from station to station, and fluid pressure supply means at one such station, said platens having passages therethrough adapted to connect with said supply means when indexed to such station, whereby a fluid medium may be introduced through such passages to operate devices carried by said platens.

28. In combination, a turntable mounted for rotation about a vertical axis, supporting means on said turntable adapted to support a plurality of platens in horizontal position laterally of such axis, platens adapted to rest on said supporting means and to have core boxes and the like mounted thereon, indexing means operative to rotate said turntable to move said platens from station to station; and rock-over means at one station operative to lift a platen from said supporting means and invert the same comprising a swinging member mounted for swinging movement about a horizontal axis beyond the outer periphery of said turntable and supporting means and adapted firmly to grip a said platen from below, and means operative to lift a said platen a short distance vertically upwardly from said supporting means preliminarily to initiation of such swinging action of said member and platen, said platens being adapted normally to rest in corresponding upwardly opening closely fitting recesses in said supporting means.

29. In a mold making machine including a turntable and platen combination, a turntable mounted for rotation about a vertical axis, pairs of spaced outwardly extending arms carried by and rigid with said turntable and having aligned upwardly open trunnion cradles adjacent the outer ends of each pair, platens adapted to be supported on said turntable in horizontal position by each said pair of arms and having trunnions closely adjacent their radially outer sides adapted to rest in said respective cradles, said platens being adapted to have core boxes and the like mounted thereon, whereby said platens may readily be lifted from and returned to said arms and may also be rocked on said trunnions to invert said platens substantially entirely beyond the periphery of the circle described by said turntable arms.

30. A mold transporting platen having spaced sets of cleats on the bottom side thereof, said sets of cleats being arranged tangential to a common arc of large radius for interengagement with complementary cleats on a support, a support having complementary cleats adapted thus to interengage said cleats on said platen, a passage through said platen and opening to the bottom side thereof at a point between the cleats of one said set, such opening of said passage being enlarged and concave for cooperation with complementary fluid pressure supply means associated with such support, and registering means on said platen for registering the same in precise position upon a horizontal turntable.

31. A mold transporting platen having spaced sets of cleats on the bottom side thereof, said sets of cleats being arranged tangential to a common arc of large radius for interengagement with complementary cleats on a support, a support having complementary cleats adapted thus to interengage said cleats on said platen, and registering means on said platen for registering the same in precise position upon a horizontal turntable.

32. In mold making mechanism, platen conveying means operative to transport a platen in horizontal position from station to station with dwells at such stations, such platen having mold-enclosing means thereon, molding means at one such station operative to lift such platen from said conveying means for performance of a molding operation and to return such platen to said conveying means at the same station after performance of such molding operation, and draw means at another such station operative to lift such platen from said conveying means for drawing of such mold and then to return such platen to said conveying means at the same station.

33. A portable platen for use with core blowers, molding machines and the like comprising a platform, work-enclosing means mounted on the upper surface of said platform, attaching means entirely on the underside of said platform adapted to be gripped by clamping means on a support, and means for registering said platen in predetermined position on a turntable comprising spaced aligned trunnions, the common axis of which lies substantially to one side of the mid-point of said platen.

References Cited in the file of this patent

UNITED STATES PATENTS

| | | |
|---|---|---|
| 819,833 | Hewlett et al. | May 8, 1906 |
| 1,556,980 | Vial | Oct. 13, 1925 |
| 1,638,665 | Lewis | Aug. 9, 1927 |
| 2,438,218 | Johnston | Mar. 23, 1948 |
| 2,568,905 | Whiehsner | Sept. 25, 1951 |
| 2,623,252 | Miller | Dec. 30, 1952 |
| 2,624,084 | Row | Jan. 6, 1953 |
| 2,627,335 | Gedris | Feb. 3, 1953 |
| 2,651,087 | Fellows | Sept. 8, 1953 |

FOREIGN PATENTS

| | | |
|---|---|---|
| 289,826 | Great Britain | Nov. 1, 1928 |